United States Patent

Matsubara et al.

[11] Patent Number: 5,671,076
[45] Date of Patent: Sep. 23, 1997

[54] IMAGE DISPLAY DEVICE USING VIBRATING MIRROR

[75] Inventors: Ken Matsubara, Takatsuki; Tsukasa Yagi, Kobe, both of Japan

[73] Assignee: Minolta Co., Ltd., Osaka, Japan

[21] Appl. No.: 533,329

[22] Filed: Sep. 25, 1995

[30] Foreign Application Priority Data

Sep. 28, 1994 [JP] Japan .................... 6-233021

[51] Int. Cl.⁶ .................................. G02B 26/08
[52] U.S. Cl. .................... 359/196; 359/197; 359/198; 359/199; 359/212; 359/214; 250/234
[58] Field of Search .................... 359/196–199, 359/201, 202, 203, 212–215, 223, 226; 347/250, 247, 259, 260; 348/195, 203, 205; 250/234–236, 206.1, 206.2, 231.18

[56] References Cited

U.S. PATENT DOCUMENTS

| 4,318,582 | 3/1982 | Minoura et al. ............ 359/202 |
| 4,934,773 | 6/1990 | Becker. | |

*Primary Examiner*—James Phan
*Attorney, Agent, or Firm*—Burns, Doane, Swecker & Mathis, LLP

[57] ABSTRACT

In a display device in which one dimensional light emitted from a light emitting element driven by an image signal generating device is scanned by moving a reflecting member so as to provide a two-dimensional image to an observer utilizing after image phenomenon, in order to prevent variation in an amplitude or variation of the center of vibration of the reflecting member which may cause image deviation, angle of displacement of the reflection member is detected by a detector, a position signal from the detector is compared with a reference signal and based on the result of comparison, the image signal generating device is controlled.

20 Claims, 11 Drawing Sheets

IMAGE DISPLAY DEVICE USING VIBRATING MIRROR

BACKGROUND OF THE INVENTION

1. Field of the Invention

The present invention relates to an image display device, and more specifically, to an image display device for outputting light, which has been imaged as one dimensional image, as a two dimensional image by using a scanner including a vibrating mirror.

2. Description of the Background Art

U.S. Pat. No. 4,934,773 discloses an image display device for outputting light, which has been originally output as one-dimensional image, as a two-dimensional image by utilizing a scanner including a vibrating mirror.

The image display device in accordance with U.S. Pat. No. 4,934,773 forms two-dimensional image by reflecting light emitted from an array of light emitting diodes by a mirror which vibrates with a prescribed amplitude. In the image display device, image signal output is controlled in association with speed and direction of movement of the mirror, in order to maintain clear display. However, in the image display device, the state of vibration of the mirror is not monitored. Actually, the amplitude or the center of vibration of the mirror may vary. If the amplitude or the center of vibration of the mirror changes, the image may possibly be shifted or deviated, even if the image forming output is controlled in association with the speed and direction of the movement of the mirror.

SUMMARY OF THE INVENTION

In view of the foregoing, an object of the present invention is to provide an image display device capable of outputting stable images.

Another object of the present invention is to provide an image display device outputting light which has been output as one-dimensional image as a two-dimensional image by scanning, which is capable of stable scanning.

A still further object of the present invention is to provide an image display device outputting two-dimensional image by reflecting emitted light by a mirror, in which timing of light emission is optimized in accordance with the change in the amplitude or the center of vibration of the mirror.

According to the present invention, position of a vibrating mirror is detected by a detector, and based on a signal from the detector, timing of output of a one-dimensional image is controlled. According to another aspect of the present invention, position of the vibrating mirror is detected by the detector and based on the signal from the detector, vibration of the mirror is controlled.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A display system which is an embodiment of the present invention will be described hereinafter with reference to the drawings. In the following description, like parts are designated by like reference numbers throughout the drawings.

(First Embodiment)

Figure 1:
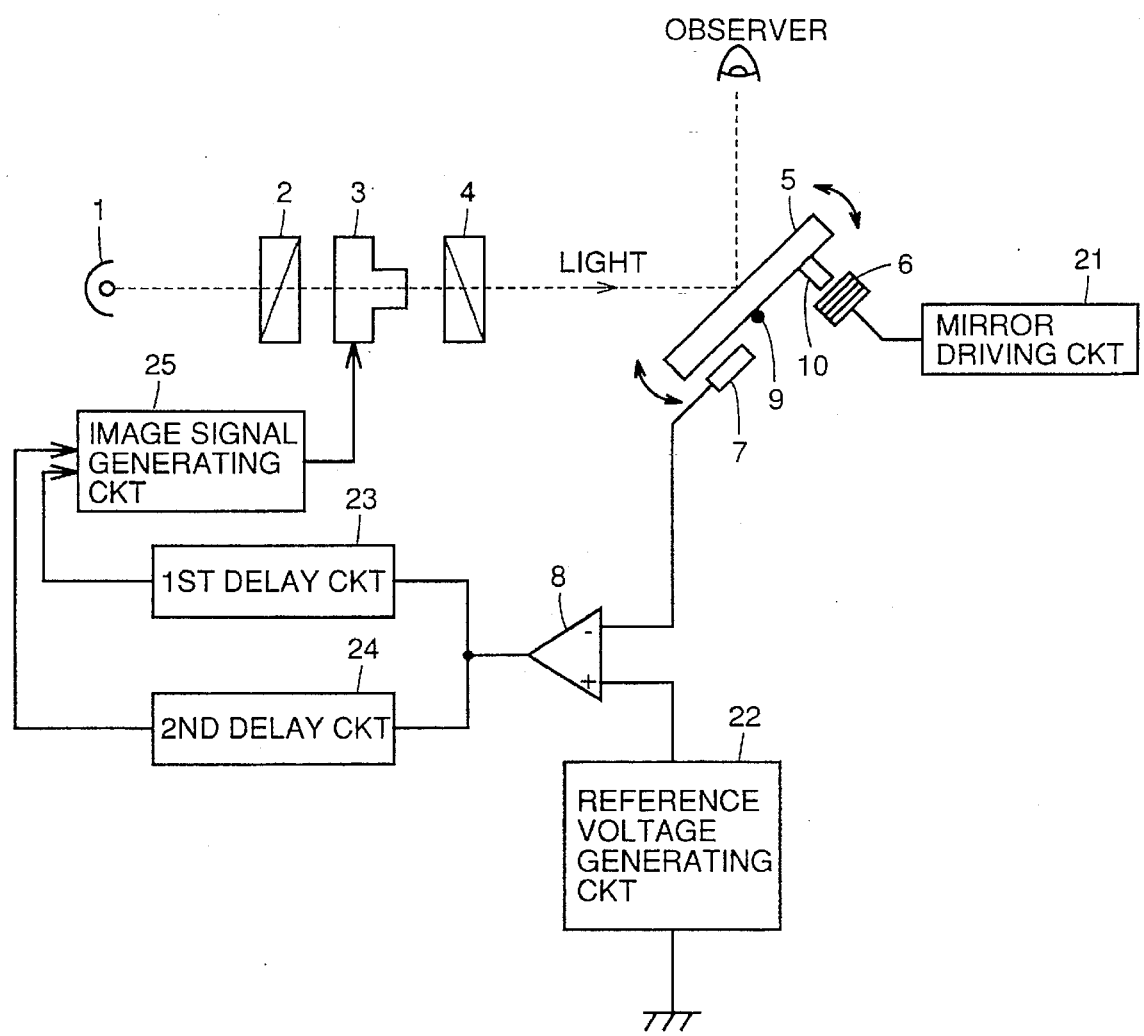
FIG. 1 is a block diagram showing a structure of an image display device employing a vibration mirror and an optical shutter array in accordance with a first embodiment of the present invention.

An image output device in accordance with a first embodiment of the present invention shown in FIG. 1 includes: a light source 1; a polarizer 2 and an analyzer 4 for polarizing light from the light source 1; a PLZT shutter array 3 which is a set of shutters arranged one dimensionally in a direction vertical to the sheet; a mirror 5 for reflecting light which has past through PLZT shutter array 3 (which mirror 5 is mounted swingable in the direction of the arrow about a fulcrum 9); a mirror position sensor (detector) 7 for detecting inclination of the mirror; a magnet 10 provided on mirror 5; a mirror coil 6 for vibrating mirror 5 including magnet 10, by generating a magnetic field; a mirror driving circuit 21 for applying a potential which changes to positive/ negative value in a prescribed period to mirror coil 6; a reference voltage generating circuit 22 for generating a reference voltage; a comparator 8 for comparing an output voltage from mirror position sensor 7 and a reference voltage; a first delay circuit 23 responsive to the output signal from comparator 8 for generating a delayed signal; a second delay circuit 24 responsive to the output signal to comparator 8 for generating a signal further delayed than the first delay circuit 23; and an image signal generating circuit 25 responsive to signals from these two delay circuits 23 and 24 for generating an image signal and for controlling PLZT optical shutter array 3.

Figure 2:
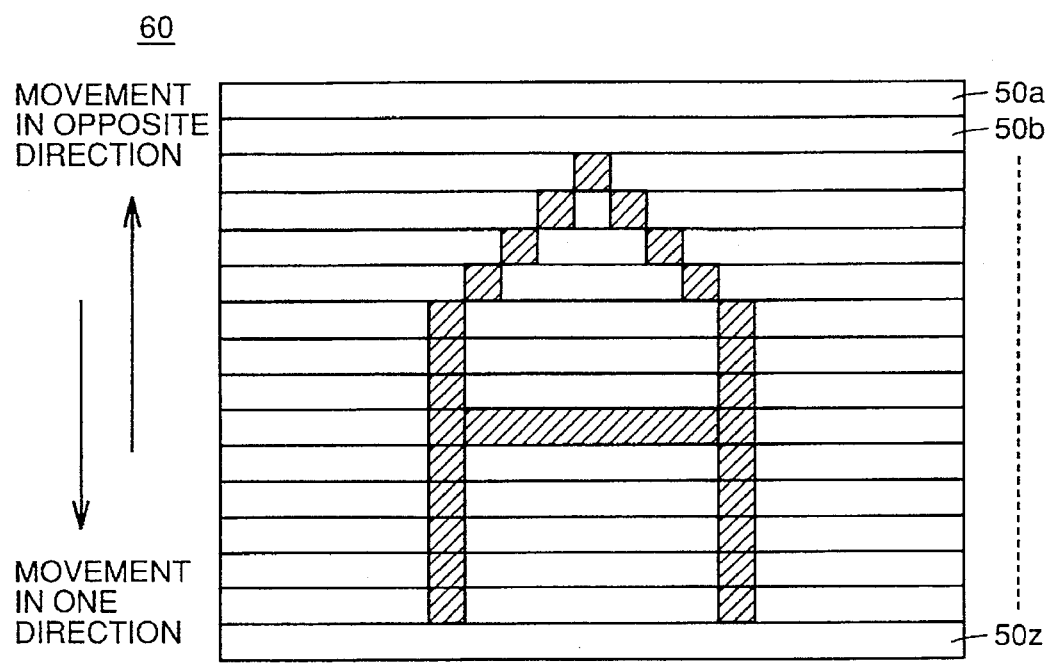
FIG. 2 is an illustration showing the operation of a PLZT shutter array 3.

FIG. 2 shows the operation of PLZT shutter array 3 shown in FIG. 1. PLZT shutter array 3 is driven in accordance with signals constituting a two-dimensional image 60 shown in FIG. 2. The two-dimensional image 60 is constituted by a plurality of one-dimensional images 50a to 50z. Driving of PLZT shutter array 3 is done in response to the movement of mirror 5. More specifically, when the mirror moves in one direction, the one-dimensional image in the two-dimensional image 60 is output along the direction of $50a\rightarrow50z$, and when the mirror moves in the opposite direction, the images are output along the direction of $50z\rightarrow50a$.

The light reflected from mirror 5 is recognized by an observer as a two-dimensional image, because of after image phenomenon on the eyes of the observer.

In this manner, in order to prevent flickering of the image, in the image display device, images are output both in the period of mirror movement in one direction and in the period of mirror movement in opposite direction, so that the number of images displayed per unit time is increased than the number of images output in either of the periods.

Figure 3:
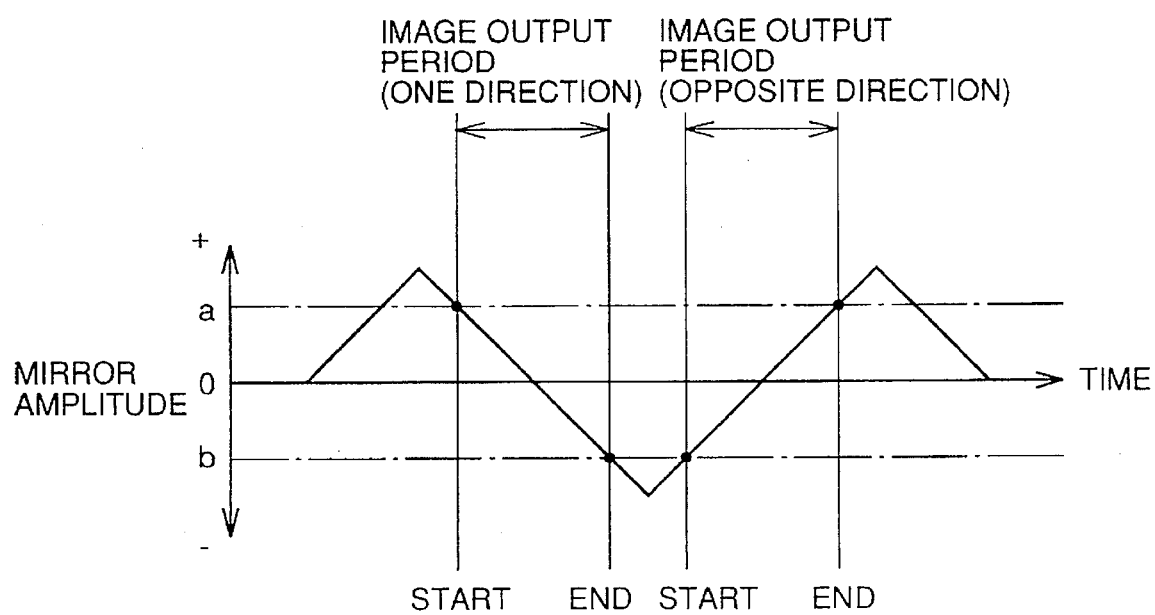
FIG. 3 shows image output timing of an image signal generating circuit 25 shown in FIG. 1.

FIG. 3 is an illustration showing the timings of image output in the image signal generating circuit 25 shown in FIG. 1.

In this figure, the ordinate represents amplitude of the vibration movement of the mirror in one and opposite directions (in which movement in one direction is represented by the sign −, while movement in the opposite direction is represented by the sign +). The abscissa represents time. The mirror vibrates between a maximum angle position and a minimum angle position.

Figure 4:
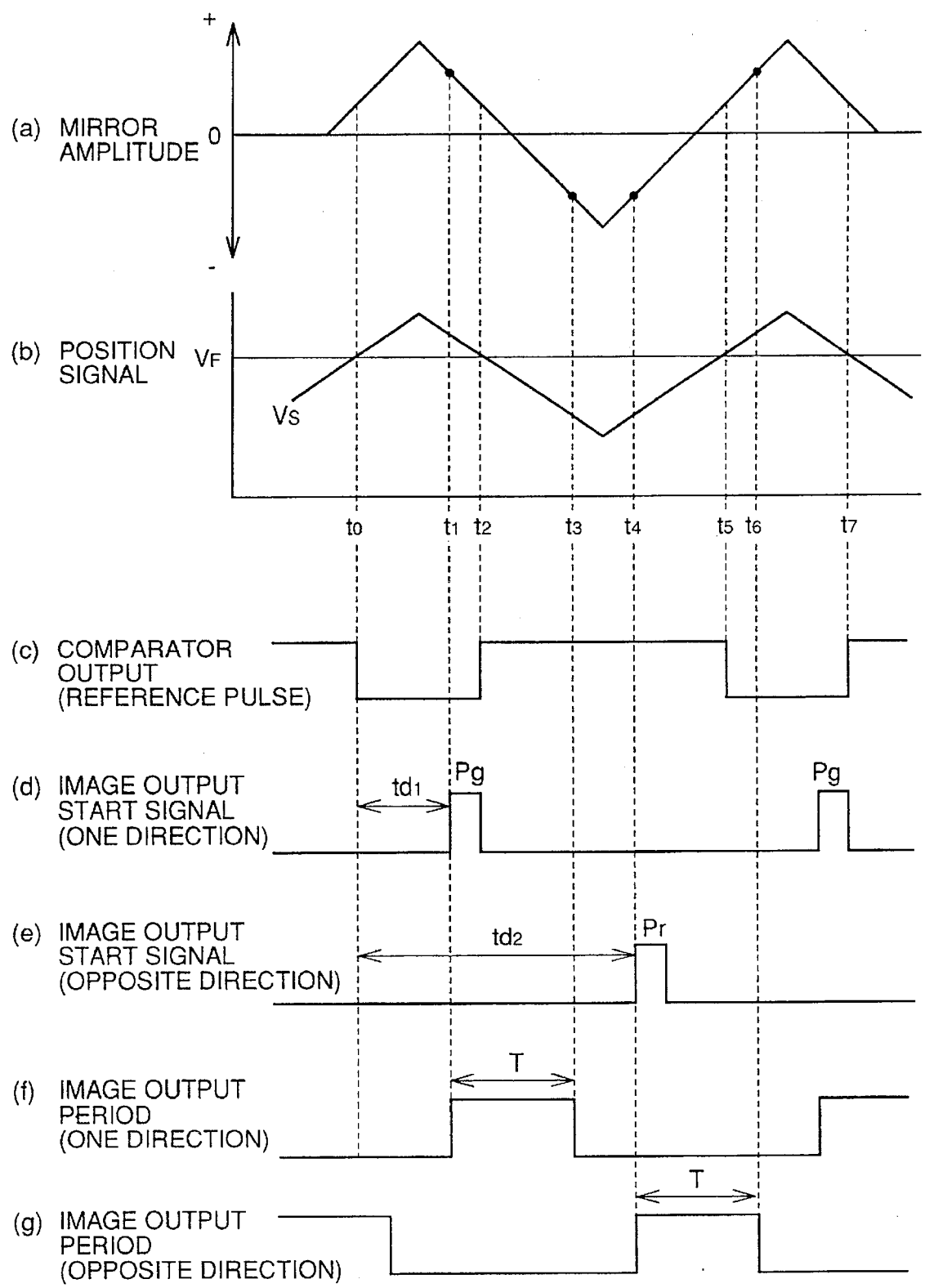
FIG. 4 shows relation between image output timing and a position detection signal output from a mirror position sensor for detecting amplitude of a mirror in the image display device shown in FIG. 1.

In the image display device, images must be output corresponding to the same amplitude (amplitude a-b) both in the mirror movement in one direction and in the opposite direction. In order to have the image output timing matched in the mirror movement in one direction and the opposite direction, the following process is carried out in the image output device shown in FIG. 1. FIG. 4 shows a relation between image output timing and a position detection signal for detecting amplitude of the mirror, output from a mirror position sensor 7.

In FIG. 4, the abscissa represents time. When mirror 5 driven by mirror driving circuit 21 is operating with such an amplitude as shown by (a), position detection signal (voltage) output from mirror position sensor 7 draws such a carve as shown by $V_S$ of (b). The line $V_F$ in (b) represents reference voltage generated by reference voltage generating circuit 22.

Comparator 8 compares $V_S$ with $V_F$, and when $V_S<V_F$ ($\sim t_0$, $t_2\sim t_5$, $t_7\sim$), a digital signal at a "H" (high) level is output, and when $V_S>V_F$ ($t_0\sim t_2$, $t_5\sim t_7$), a digital signal at a "L" (low) level is output (time chart (c)).

At a time point ($t_1$) after a lapse of $t_{d1}$ from the moment ($t_0$) of change of the output from comparator 8 from "H" to "L", the first delay circuit 23 generates an image output start signal in one direction (first start signal) $P_g$ (time chart (d)). At a time point ($t_4$) after the lapse of time $t_{d2}$ ($t_{d2}>t_{d1}$) from the moment ($t_0$) of change of the output from comparator 8 from "H" to "L", the second delay circuit 24 generates an image output start signal in the opposite direction (second start signal) $P_r$ (time chart (e)).

In response to the image output start signal (first start signal) $P_g$, image signal generating circuit 25 outputs image signals corresponding to the operation of the mirror in one direction during a time period T, to PLZT shutter array 3 (time chart (f)).

In response to the image output start signal (second start signal) $P_r$, image signal generating circuit 25 outputs image signals corresponding to the operation of the mirror in the opposite direction for a time period T to PLZT shutter array 3 (time chart (g)). Of the light output from light source 1, only that part which could have past through polarizer 2, PLZT shutter array 3 and analyzer 4 reaches mirror 5.

Consequently, images corresponding to the operation of the mirror in one direction are output in the time period from $t_1$ to $t_3$, and images corresponding to the operation of the mirror in the opposite direction are output in the time period from time $t_4$ to $t_6$.

(Second Embodiment)

Figure 5:
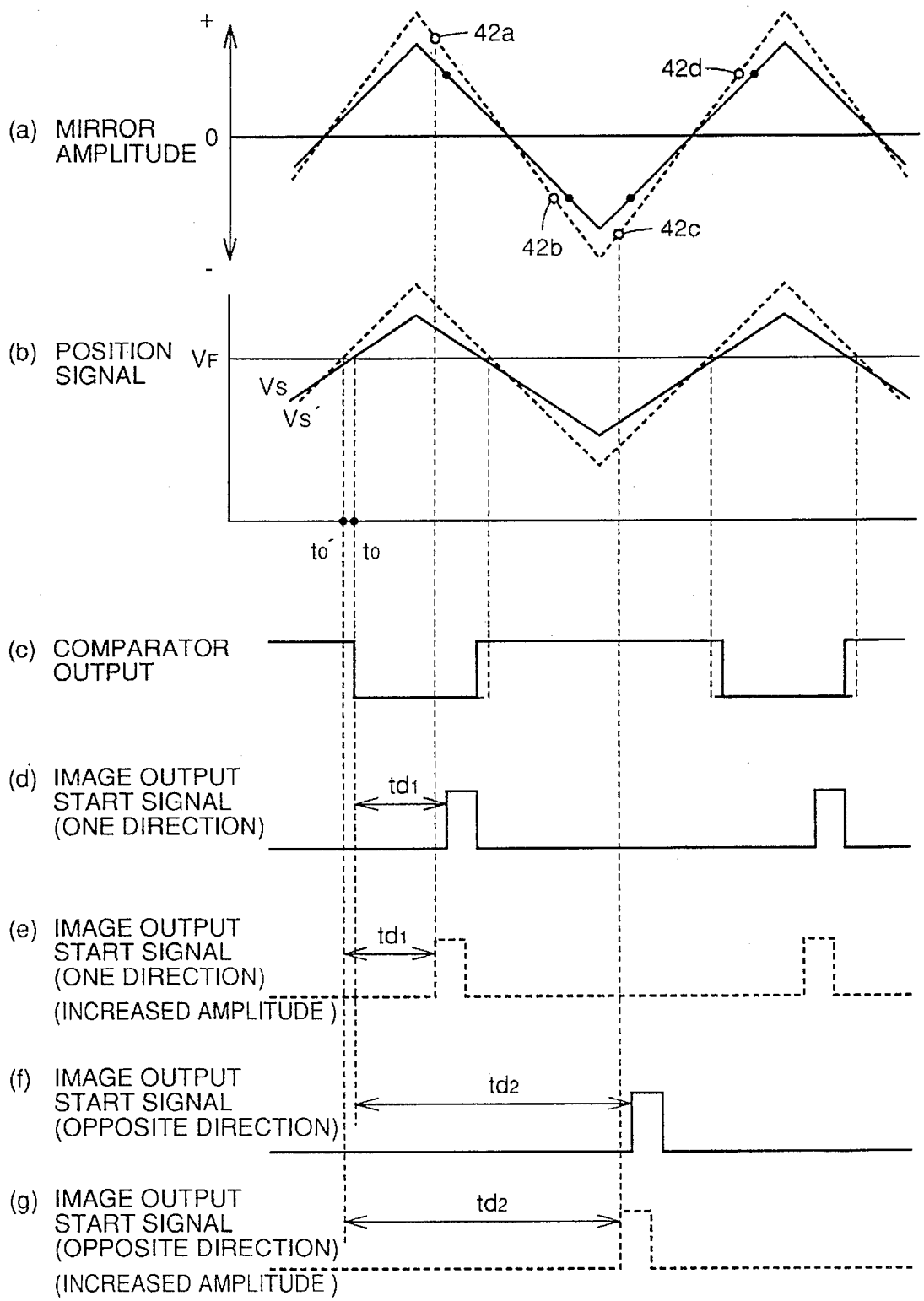
FIG. 5 is an illustration showing a problem of the image display device shown in FIG. 1.

In the image output device in accordance with the first embodiment, amplitude and the center of vibration of the mirror may possibly vary because of fluctuation in power supply voltage of the mirror driving circuit or variation in the angle of arrangement of the mirror. For example, when the amplitude of the mirror changes from the amplitude (normal amplitude) represented by a solid line in FIG. 5(a) to the amplitude represented by a dotted line, the position detecting signal output from mirror position sensor 7 also changes from the signal $V_s$ shown by the solid line in (b) to the signal $V_s'$ represented by the dotted line.

Accordingly, the moment at which the output of comparator 8 changes from "H" to "L" (time chart (c)) varies from $t_0$ to $t_0'$. Accordingly, the start signals (time charts (d), (f)) in the normal operation represented by the solid line are shifted to (e) and (g) of the time chart represented by the dotted lines. Accordingly, the image output timing changes from the position denoted by the black circle (normal operation) to the position represented by the white circle shown in FIG. 5(a), and hence the images corresponding to the mirror movement in one direction deviate from the images corresponding to the mirror movement in the opposite direction.

Figure 6:
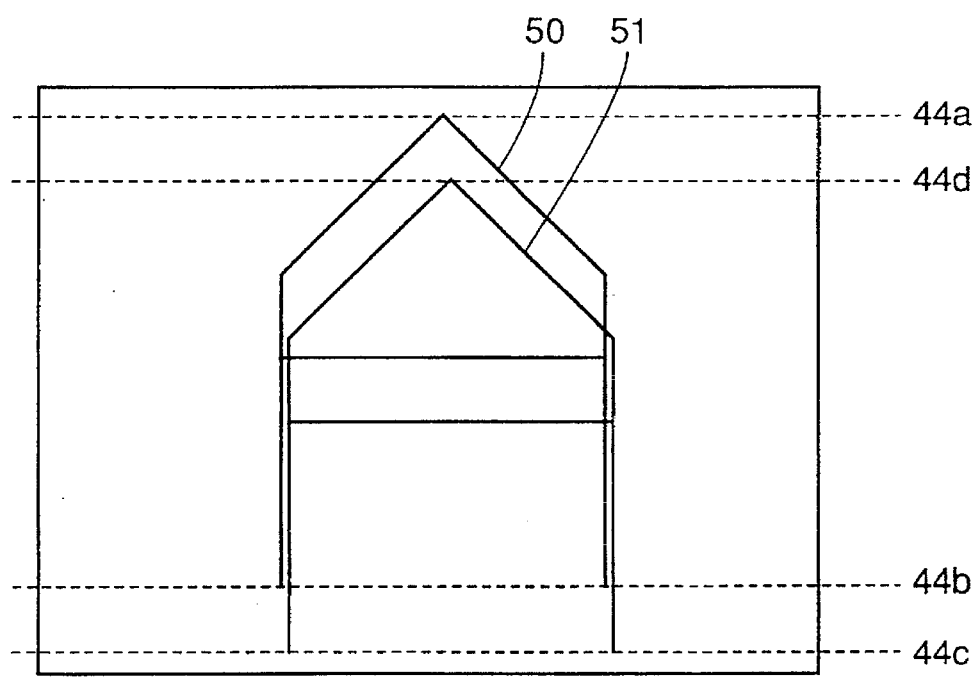
FIG. 6 is an illustration showing image deviation generated in the image display device shown in FIG. 1.

Here, deviation of images refer to mismatching of the image 50 obtained during the mirror movement in one direction and the image 51 obtained during the mirror movement in the opposite direction, such as shown in FIG. 6. More specifically, the image formed corresponding to the positions 42a to the position 42b denoted by white circles with mirror amplitude (a) corresponds to the image starting from 44a and reaching 44b of FIG. 6, and the image formed corresponding to the positions 42c to the position 42d represented by white circles of FIG. 5 corresponds to the image starting from 44c and reaching 44d of FIG. 6.

By the image display device in accordance with the second embodiment of the present invention, such deviation of the image can be eliminated.

Figure 7:
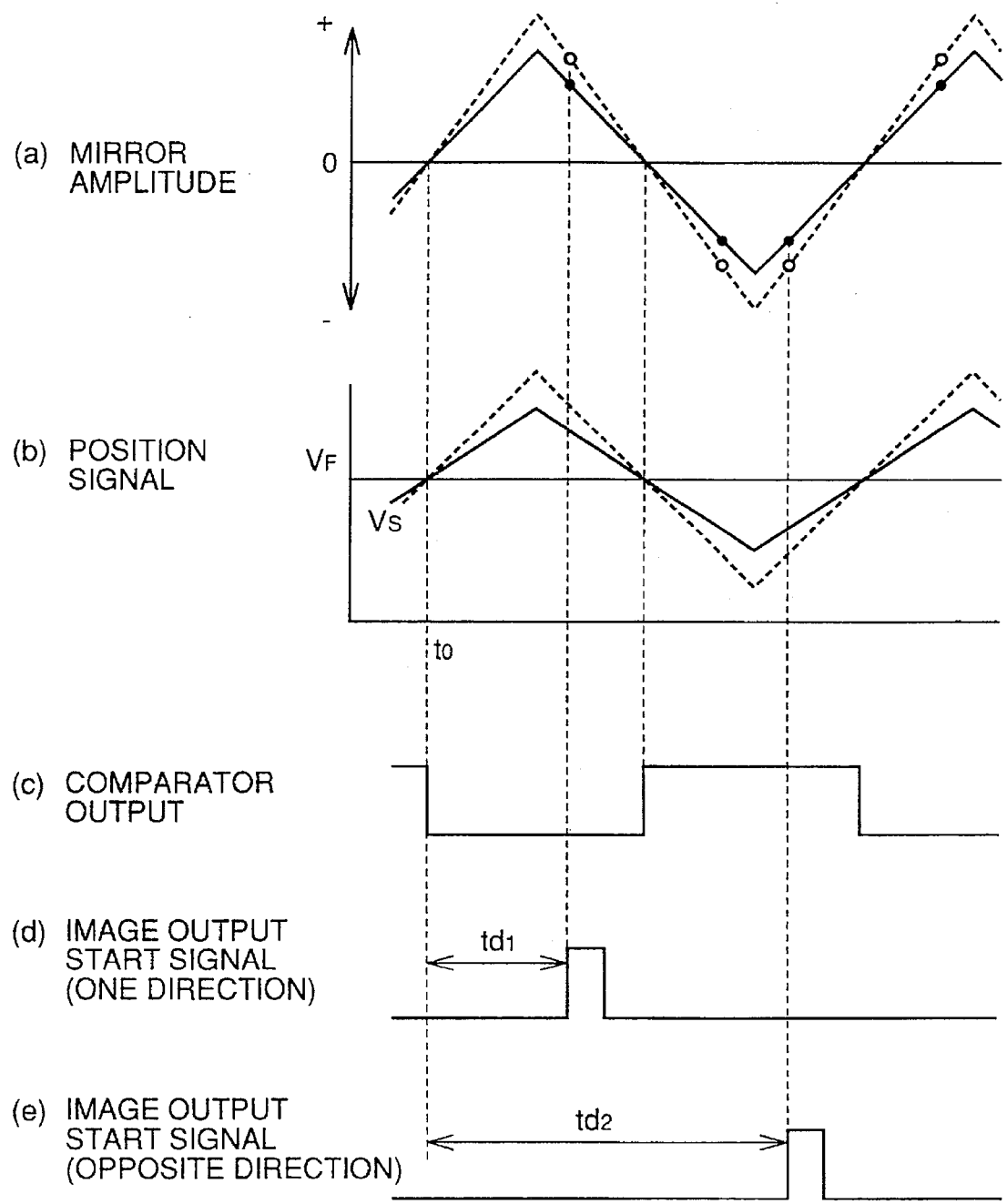
FIG. 7 shows mirror amplitude and the timing of image output start signal in the image output device in accordance with a second embodiment of the present invention.

FIG. 7 shows the timing of image output start signal and the mirror amplitude of the image display device in accordance with the second embodiment of the present invention.

The structure of the image display device in the second embodiment is the same as that of the first embodiment shown in FIG. 1. Therefore, description thereof is not repeated.

The image display device in accordance with the second embodiment is characterized in that central value (voltage at the center of vibration of the mirror) of the voltage $V_S$ generated by mirror position sensor 7 is the same as the reference voltage $V_F$ generated from reference voltage generating circuit 22. In the second embodiment, the reference voltage $V_F$ is set to the voltage of the mirror position sensor 7 at the center of vibration of the mirror. Therefore, even when the amplitude of the mirror changes from the amplitude (normal amplitude) represented by the solid line of FIG. 7(a) to the amplitude represented by the dotted line, the pulse duty of the output from comparator 8 is always 50%. Accordingly, even when there is the amplitude variation, the reference time point $t_0$ is not changed, the variation of phase in the image output start signal is eliminated, and hence start point and end point of the image output start signals are not changed in the mirror operation in one and opposite directions, regardless of the amplitude of the mirror. Accordingly, image deviation can be avoided.

Figure 8:
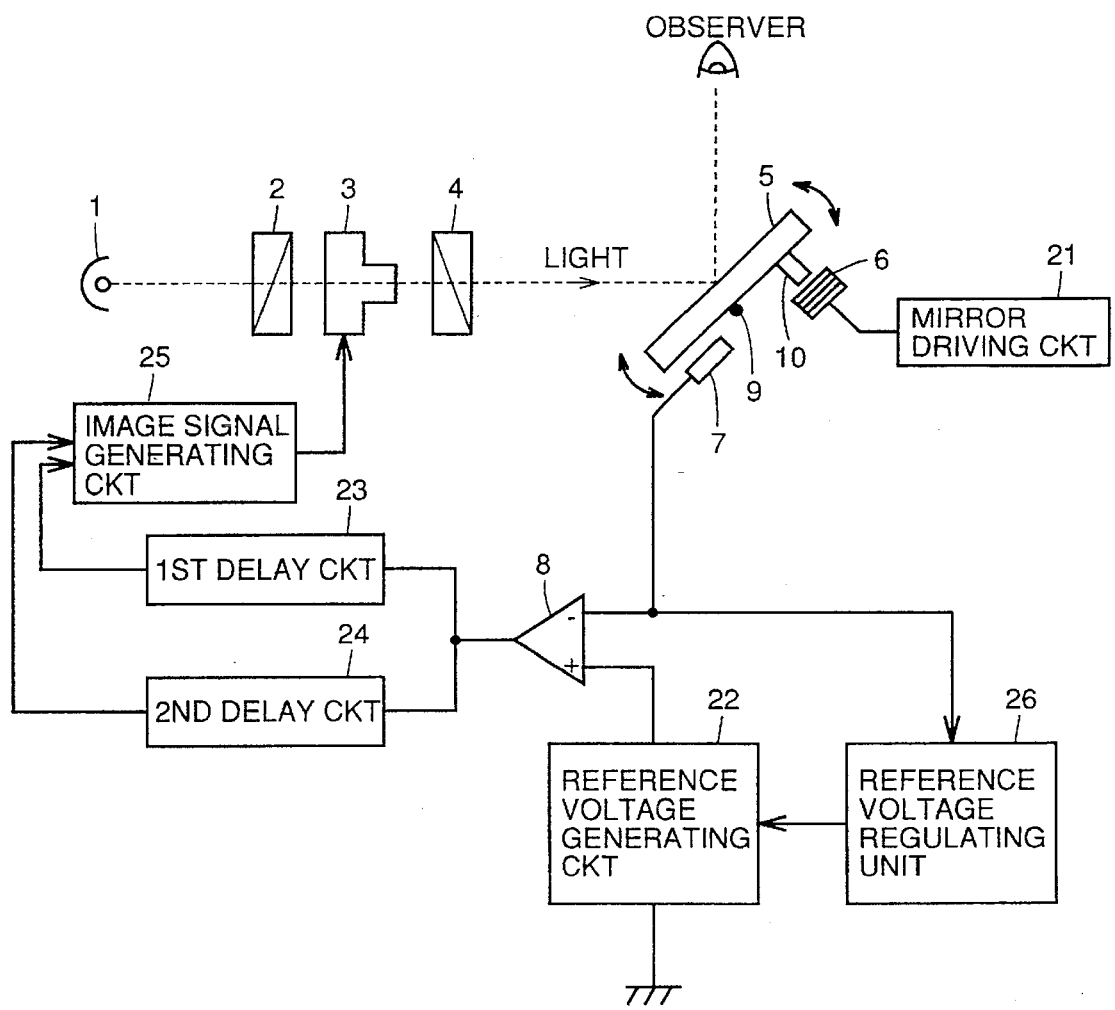
FIG. 8 is a block diagram showing a structure of the image display device including a reference signal regulation unit in accordance with a modification of the second embodiment of the present invention.

A reference voltage regulating unit 26 for regulating the reference voltage based on the voltage of the mirror position sensor 7 may be provided as shown in FIG. 8, so that the reference voltage matches the voltage of the mirror position sensor 7 at the center of the vibration of the mirror. Specifically, reference voltage regulating unit 26 recognizes a central value between the maximum and minimum values of the position detection signal $V_S$ from mirror position sensor 7, and sets the value of the reference voltage $V_F$ generated from reference voltage generating circuit 22 to the central value between the maximum and minimum values of the signal from mirror position sensor 7.

(Third Embodiment)

Figure 9:
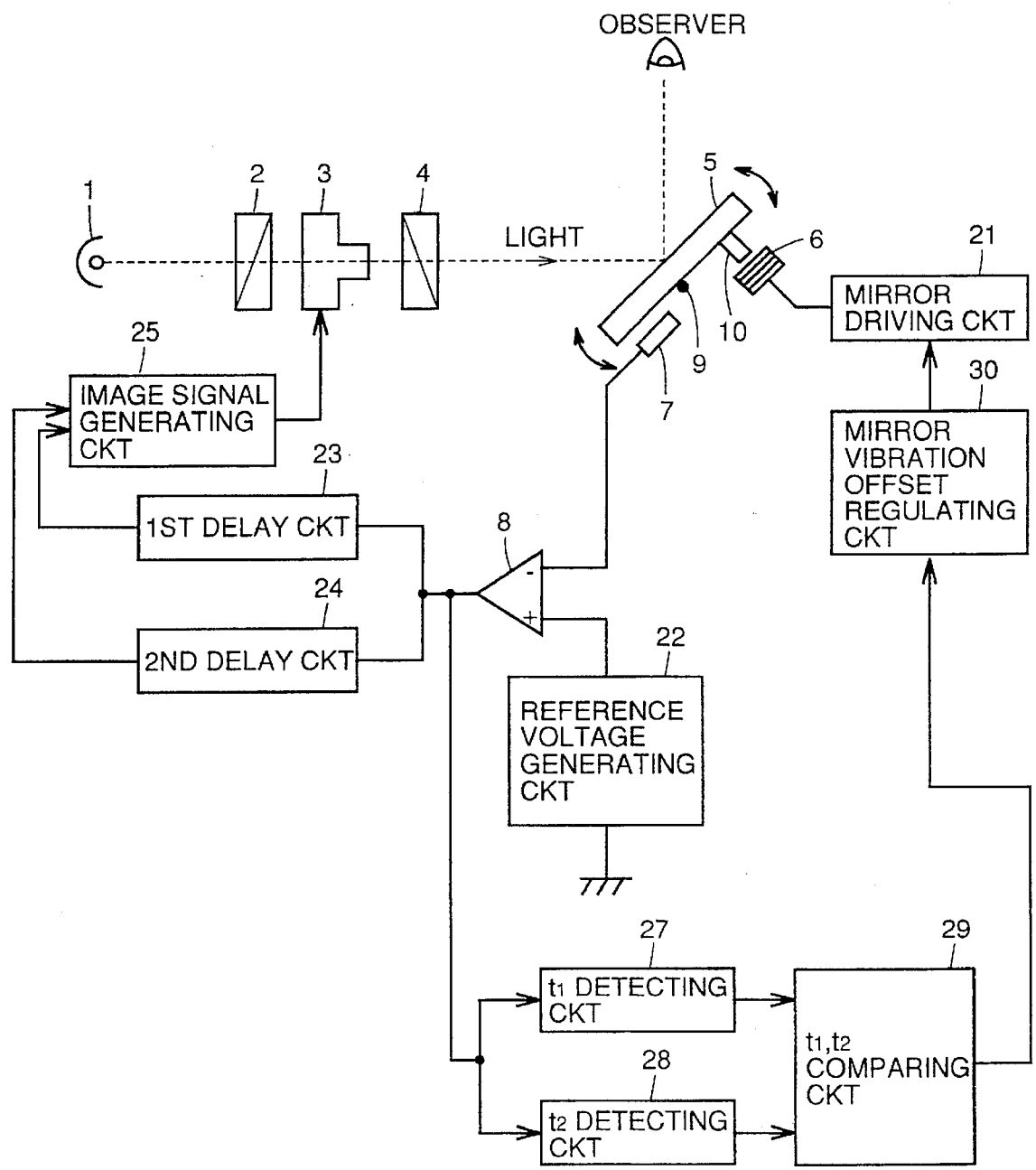
FIG. 9 is a block diagram showing a structure of the image output device in accordance with a third embodiment of the present invention.

FIG. 9 is a block diagram showing a structure of the image display device in accordance with the third embodiment of the present invention. The image display device in accordance with the present invention includes, in addition to the components of the image display device shown in FIG. 1, a $t_1$ detecting circuit 27 for measuring a period ($t_1$) in which the output from comparator 8 is at the "L" level; a $t_2$ detecting circuit 28 for detecting a period ($t_2$) in which the output from he comparator 8 is at the "H" level; a $t_1$, $t_2$ comparator 29 for comparing $t_1$ with $t_2$; and a mirror vibration offset regulating circuit (deflector controller) 30 for adjusting offset of mirror vibration in response to the signal from $t_1$, $t_2$ comparator 29.

Figure 10:
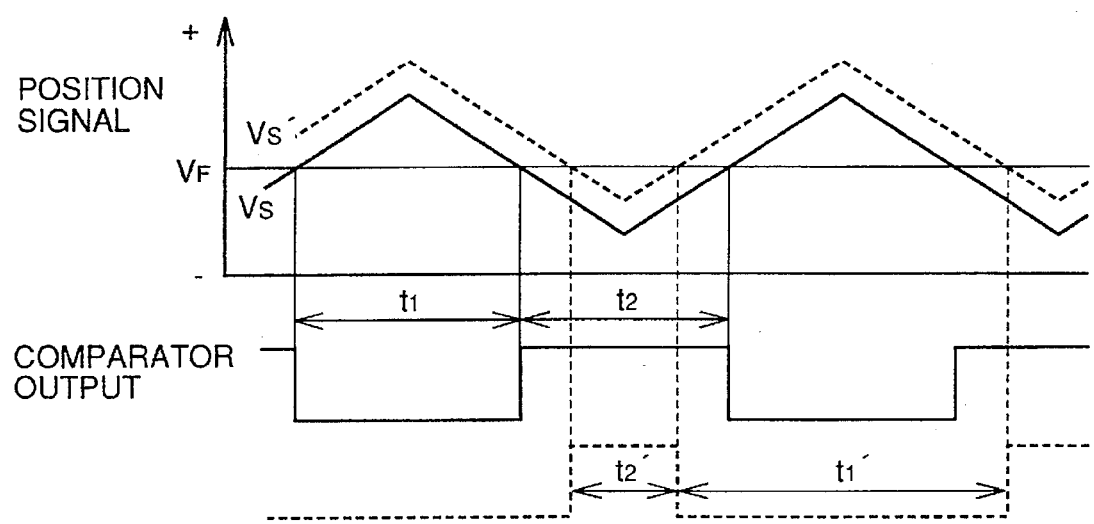
FIG. 10 shows an output from a mirror position sensor 7 and an output from a comparator 8 of the image output device shown in FIG. 9.

FIG. 10 shows an output from mirror position sensor 7 of the image display device and the output from comparator 8 shown in FIG. 9.

In the image display device in accordance with the present invention, a time period $t_1$ in which the output from comparator 8 is at "L" level and the time period $t_2$ in which it is at the "H" level are detected by $t_1$ detecting circuit 27 and $t_2$ detecting circuit 28. When it is determined by $t_1$, $t_2$ comparator 29 that the time period corresponding to the "H" level does not coincide with time period corresponding to the "L" level, a signal is transmitted to mirror vibration offset regulating circuit 30, and mirror vibration is adjusted so that the time period corresponding to the "H" level becomes equal to the time period corresponding the "L" level. More specifically, when the mirror vibration is offset and the position detection signal changes from the solid line (normal signal) $V_S$ to the dotted line $V_S'$, the output from comparator 8 changes from the state represented by the solid line ($t_1=t_2$) to the state of the dotted line $t_2'<t_1'$. The $t_1$, $t_2$ comparator circuit 29 detects this change, and transmits a signal to mirror vibration offset regulating circuit 30. Mirror vibration offset regulating circuit 30 controls mirror driving circuit 21 so that $t_1$ and $t_2$ have the same value.

In the image display device in accordance with the third embodiment, the center of vibration of the mirror can be fixedly maintained, and hence image deviation caused by the change in amplitude and the change of the center of vibration of the mirror can be avoided.

(Fourth Embodiment)

Figure 11:
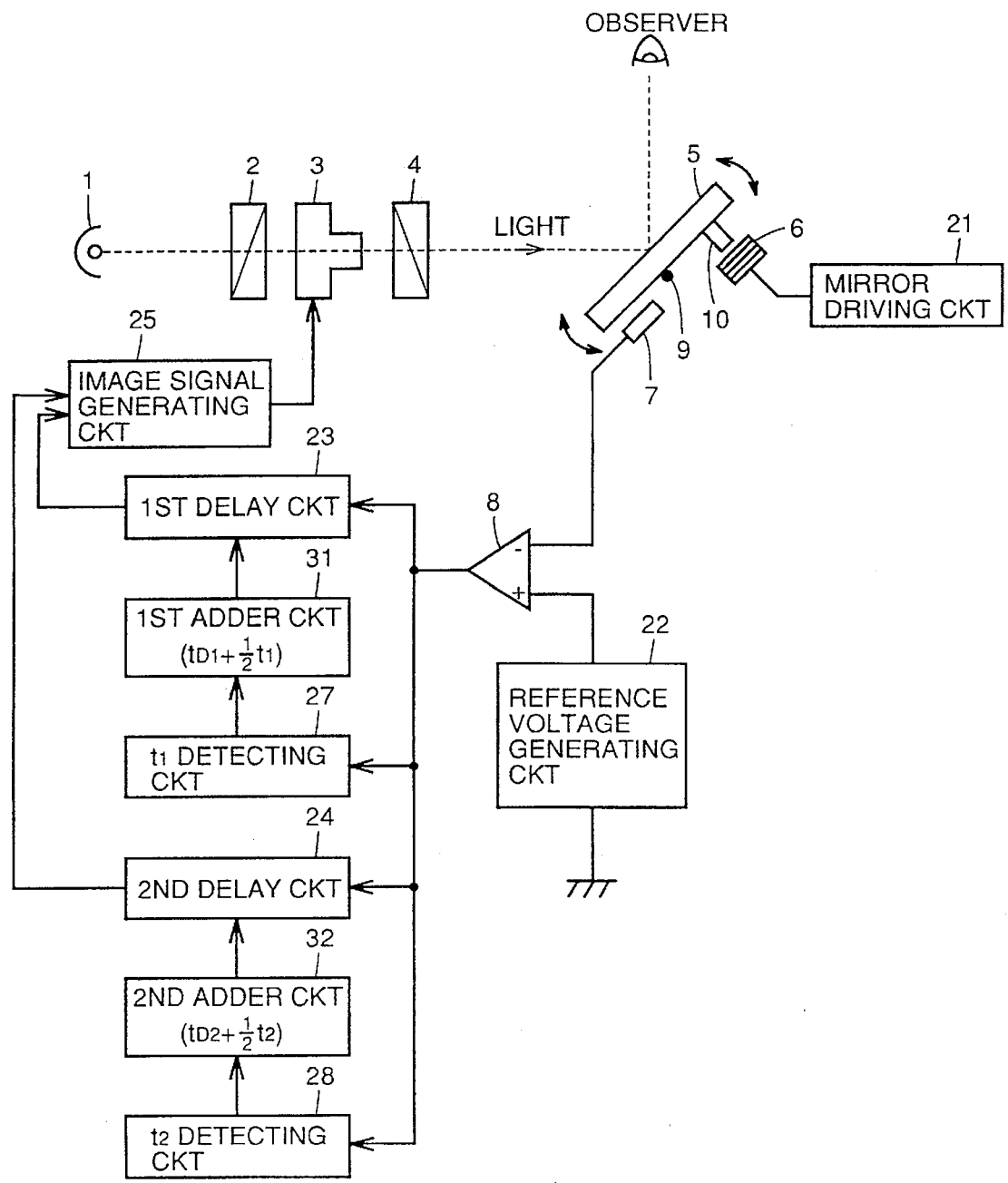
FIG. 11 is a block diagram showing a structure of the image output device in accordance with a fourth embodiment of the present invention.

FIG. 11 is a block diagram showing a structure of the image display device in accordance with a fourth embodiment of the present invention.

Referring to FIG. 11, the image display device in accordance with the fourth embodiment will be described. The image display device of the present embodiment includes, in addition to the components of the image display device shown in FIG. 1, a $t_1$ detecting circuit 27 for detecting a time period ($t_1$) in which the output of comparator 8 is at the "L" level; a first adder circuit 31 storing a constant $t_{D1}$ and for performing addition of $t_{D1}+t_1/2$; a first delay circuit 23 for generating an image output start signal corresponding to the mirror movement in one direction after the lapse of time $t_{D1}+t_1/2$ from the moment when the output from comparator 8 changes from "H" level to "L" level; a $t_2$ detecting circuit 28 for detecting a time period ($t_2$) in which the output from comparator 8 is at the "H" level; a second adder circuit 32 storing a constant $t_{D2}$ and for performing addition of $t_{D2}+t_2/2$; and a second delay circuit 24 for generating an image output start signal corresponding to the mirror movement in the opposite direction after the lapse of time $t_{D2}+t_2/2$ from the moment when the output from comparator 8 changes from the "L" level to the "H" level.

Figure 12:
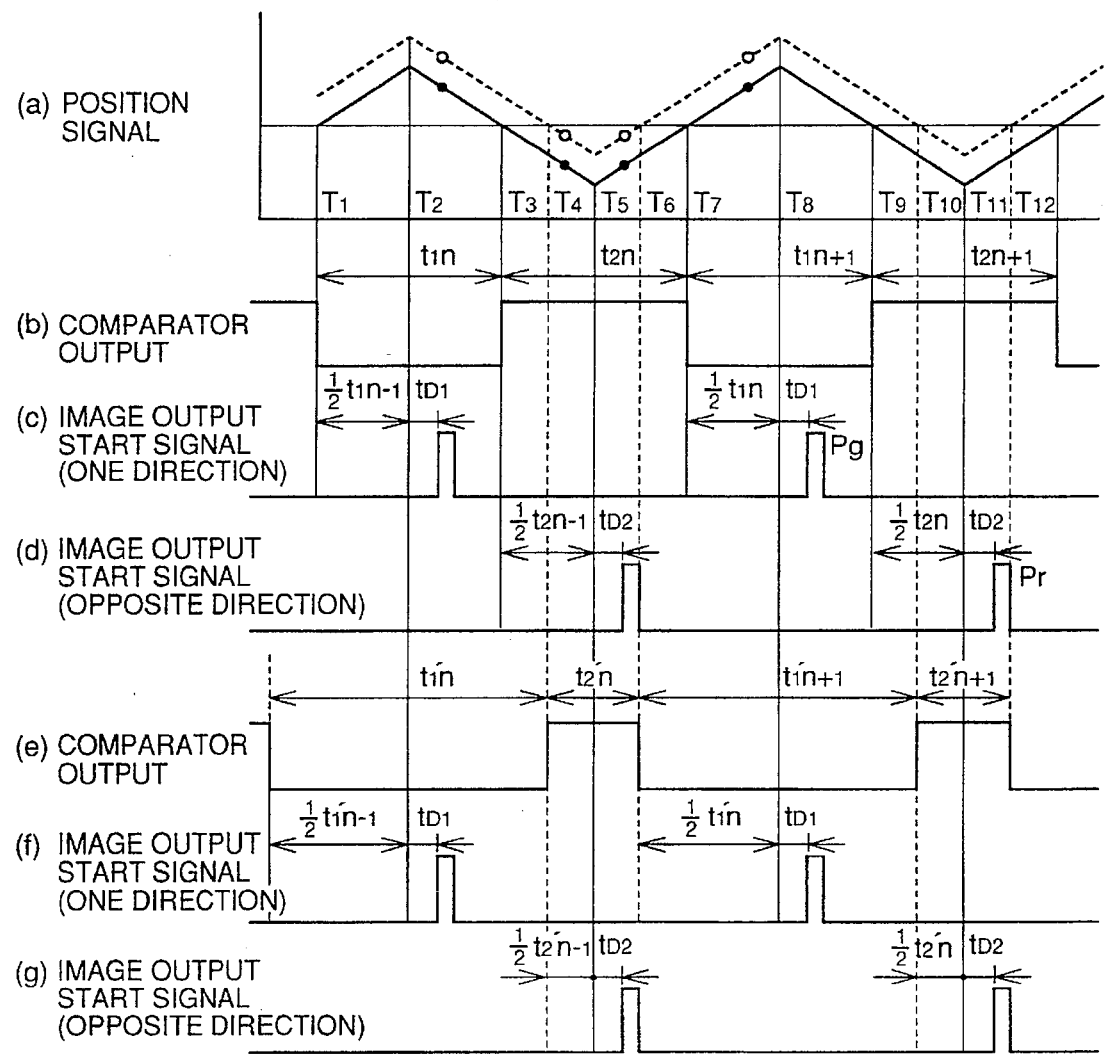
FIG. 12 shows timings of output from a mirror position sensor, output from comparator 8 and image output start signals in one and opposite directions, in the image output device shown in FIG. 11.

FIG. 12 shows the timing of output from the mirror position sensor 7, the output from comparator 8 and the image output start signals in one and opposite directions, of the image display device shown in FIG. 11.

In the image display device in accordance with this embodiment, the central value of the period $t_2$ in which the comparator output is "H" level and the central value of the period $t_1$ in which it is at the "L" are calculated, and hence the time point when the mirror has the maximum amplitude is found. After the lapse of prescribed time periods $t_{D1}$ and $t_{D2}$ from the maximum amplitude, image start signals are output respectively.

More specifically, the operation when the mirror position signal output from mirror position sensor 7 is as shown by the solid line of FIG. 12(a) is as follows.

First, from $T_1$ to $T_3$, the time period $t_{1n}$ in which the output of comparator 8 is at the "L" level is found by $t_1$ detecting circuit 27 (time chart (b)). Then by the first adder circuit 31, addition of $t_{D1}+t_{1n}/2$ is performed. After the lapse of time $t_{D1}+t_{1n}/2$ from the moment ($T_7$) when the output from comparator next changes from "H" to "L", an image output start signal $P_g$ in one direction is generated (time chart (c)).

Similarly, by $t_2$ detecting circuit 28, from $T_3$ to $T_7$, the time period $t_{2n}$ in which the output of comparator 8 is at the "H" level is measured (time chart (b)). Then, by the second adder circuit 32, addition of $t_{D2}+t_{2n}/2$ is performed, and after the lapse of time $t_{D2}+t_{2n}/2$ from the moment ($T_9$) when the output from comparator 8 again changes from "L" to "H", the image output start signal $P_r$ in the opposite direction is output (time chart (d)).

Accordingly, when the center of vibration of the mirror varies and the mirror position detecting signal changes as represented by the dotted line in FIG. 6(a), the period ($t_1'$) in which the output of comparator 8 is "L" becomes longer than the time period ($t_2'$) in which it is "H" as shown in time chart (e), while $t_2'/2$ and $t_1'/2$ always correspond to the time points ($T_2$, $T_8$) of the maximum amplitude of the position detecting signal. In the present invention, time points after the lapse of prescribed time periods $t_{D1}$ and $t_{D2}$ from the time points ($T_2$, $T_8$) of the maximum amplitude are determined to be the time points for signal generation (time chart (f), (g)). Therefore, even when there is an offset or variation of the amplitude, image signals corresponding to the mirror operation in one direction and the other direction match each other, and hence image deviation can be avoided.

Though a light source and a PLZT shutter array has been used for outputting image signals in the embodiments above, an LED array, an LCD array or the like may be used alternatively.

Further, a reflection photo interrupter, a transmission photo interrupter or the like may be used as the mirror position sensor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image display device, comprising;
    an image signal generating device for outputting an image signal;
    a light emitting device for outputting light as a one-dimensional image in accordance with said output image signal;
    a deflector having a movable reflecting surface for reflecting said output light as the one-dimensional image;
    a detector for detecting position of said movable reflecting surface and for outputting a position signal corresponding to the detected position;
    a comparator for comparing said position signal and a reference signal, for outputting a comparator signal; and
    a controller for controlling said image signal generating device based on said comparator signal; wherein
    the light as the one-dimensional image reflected by said movable reflecting surface is recognized as a two-dimensional image because of after image phenomenon on the eyes of an observer.

2. The image display device according to claim 1, wherein said controller controls said image signal generating device such that output of the image signal starts after a lapse of a prescribed time period from a rise or a fall of said comparator signal.

3. The image display device according to claim 2, wherein said prescribed time period is one half the period in which the value of said position signal is larger than the value of said reference signal or one half the period in which the value of said position signal is smaller than the value of said reference signal, plus a fixed time period.

4. The image display device according to claim 3, wherein said movable reflecting surface moves in one and opposite directions about a rotation axis;
    said controller includes
    first start signal generating means for generating a first start signal when said movable reflecting surface moves in one direction, and
    second start signal generating means for generating a second start signal when said movable reflecting surface moves in the opposite direction; and
    said image signal generating device outputs an image signal in response to said first start signal and to said second start signal.

5. The image display device according to claim 1, wherein said light emitting device includes a PLZT shutter array.

6. The image display device according to claim 1, wherein said deflector includes a reflection mirror, a mirror driving device and a mirror driving circuit.

7. The image display device according to claim 6, wherein said reflection mirror includes a magnet, and
    said mirror driving device includes a coil for driving said reflection mirror.

8. The image display device according to claim 1, wherein said position signal and said reference signal are respectively output as voltage values.

9. The image display device according to claim 1, wherein said movable reflecting surface moves in one and opposite directions about a rotation axis;
    said controller includes first start signal generating means for generating a first start signal when said movable reflecting surface moves in one direction, and
    second start signal generating means for generating a second start signal when said movable reflecting surface moves in the opposite direction; and
    said image signal generating device outputs an image signal in response to said first start signal and to said second start signal.

10. The image display device according to claim 9, wherein
    said first start signal generating means generates said first start signal after a lapse of a first prescribed time period from a rise or a fall of said comparator signal, and
    said second start signal generating means generates said second start signal after a lapse of a second prescribed time period from a rise or a fall of said comparator.

11. The image display device according to claim 1, wherein
    said controller includes a start signal generating means for generating a start signal after a lapse of a prescribed time period from a rise or a fall of said comparator signal, and
    said image signal generating device starts output of an image signal in response to said start signal.

12. The image display device according to claim 11, wherein
    said movable reflecting surface moves in one direction and an opposite direction about a rotation axis;
    said start signal generating means includes
    first start signal generating means for generating a start signal while said movable reflecting surface is moving in one direction, and
    second start signal generating means for generating a start signal while said movable reflecting surface is moving in the opposite direction.

13. The image display device according to claim 1, further comprising:
    reference signal regulating means for regulating said reference signal so that it coincides with a central value of an amplitude of said position signal.

14. The image display device according to claim 1, wherein
    said movable reflecting surface moves between a position of a minimum angle and a position of an maximum angle about a rotation axis;
    said image display device further comprising
    reference signal regulating means for regulating said reference signal based on a position signal output from said detector at the position of said minimum angle of said movable reflecting surface and on a position signal output from said detector at a position of said maximum angle of said movable reflecting surface.

15. The image display device according to claim 1, wherein
    said comparator signal includes a first state indicating that a value of said position signal is larger than a value of said reference signal and a second state indicating that a value of said position signal is smaller than the value of said reference signal;
    said image display device further comprising
    deflector control means for controlling said deflector such that a period corresponding to said first state coincides with a period corresponding to said second state.

16. The image display device according to claim 1, further comprising:

first detecting means for detecting a first period in which a value of said position signal is larger than a value of said reference signal;

first calculating means for calculating a first delay time by adding a first constant time period to one half said first period;

second detecting means for detecting a second time period in which the value of said position signal is smaller than the value of said reference signal; and second calculating means for calculating a second delay time by adding a second prescribed time period to one half said second period; wherein said controller controls said image signal generating device such that image signal output is started at a time point after lapse of said first delay time from a start of said first period and a time point after the lapse of the second delay time from a start of said second period.

17. The image display device, comprising:

an image signal generating device for outputting an image signal;

a light emitting device for outputting light as a one-dimensional image in accordance with said output image signal;

a deflector having a movable reflecting surface reflecting said output light as the one-dimensional image;

a detector for detecting position of said movable reflection surface and for outputting a position signal corresponding to the detected position;

a reference signal generator for generating a reference signal based on operation of said movable reflection surface;

a comparator for comparing said position signal and said reference signal and for outputting a comparator signal; and a controller for controlling said image signal generating device based on said comparator signal; wherein light as the one-dimensional image reflected by said movable reflecting surface is recognized as a two-dimensional image because of after image phenomenon on the eyes of an observer.

18. The image display device according to claim 17, wherein said movable reflecting surface periodically moves between a position of a minimum angle and a position of a maximum angle about a rotation axis; and said reference signal generator generates a reference signal based on a position signal output from said detector at a position of said minimum angle of said movable reflecting surface and a position signal output from said detector at a position of said maximum angle of said movable reflecting surface.

19. An image display device, comprising;

an image signal generating device for outputting an image signal;

a light emitting device for outputting light as a one-dimensional image in accordance with said output image signal;

a deflector having a movable reflection surface for reflecting said output light as the one-dimensional image;

a detector for detecting position of said movable reflection surface and for outputting a position signal corresponding to detected angle;

a comparator for comparing said position signal and reference signal for outputting a comparator signal;

a controller for controlling said image signal generating device based on said comparator signal; and a deflector controller for controlling said deflector based on said position signal; wherein light as the one-dimensional image reflected by said movable reflecting surface is recognized as a two-dimensional image by after image phenomenon on eyes of an observer.

20. The image display device according to claim 19, wherein said comparator signal includes a first state indicating that said position signal is larger than said reference signal, and a second state indicating that said position signal is smaller than said reference signal; and said deflector controller controls said deflector such that length of a period corresponding to said first state becomes the same as length of a period corresponding to said second state.

* * * * *